UNITED STATES PATENT OFFICE.

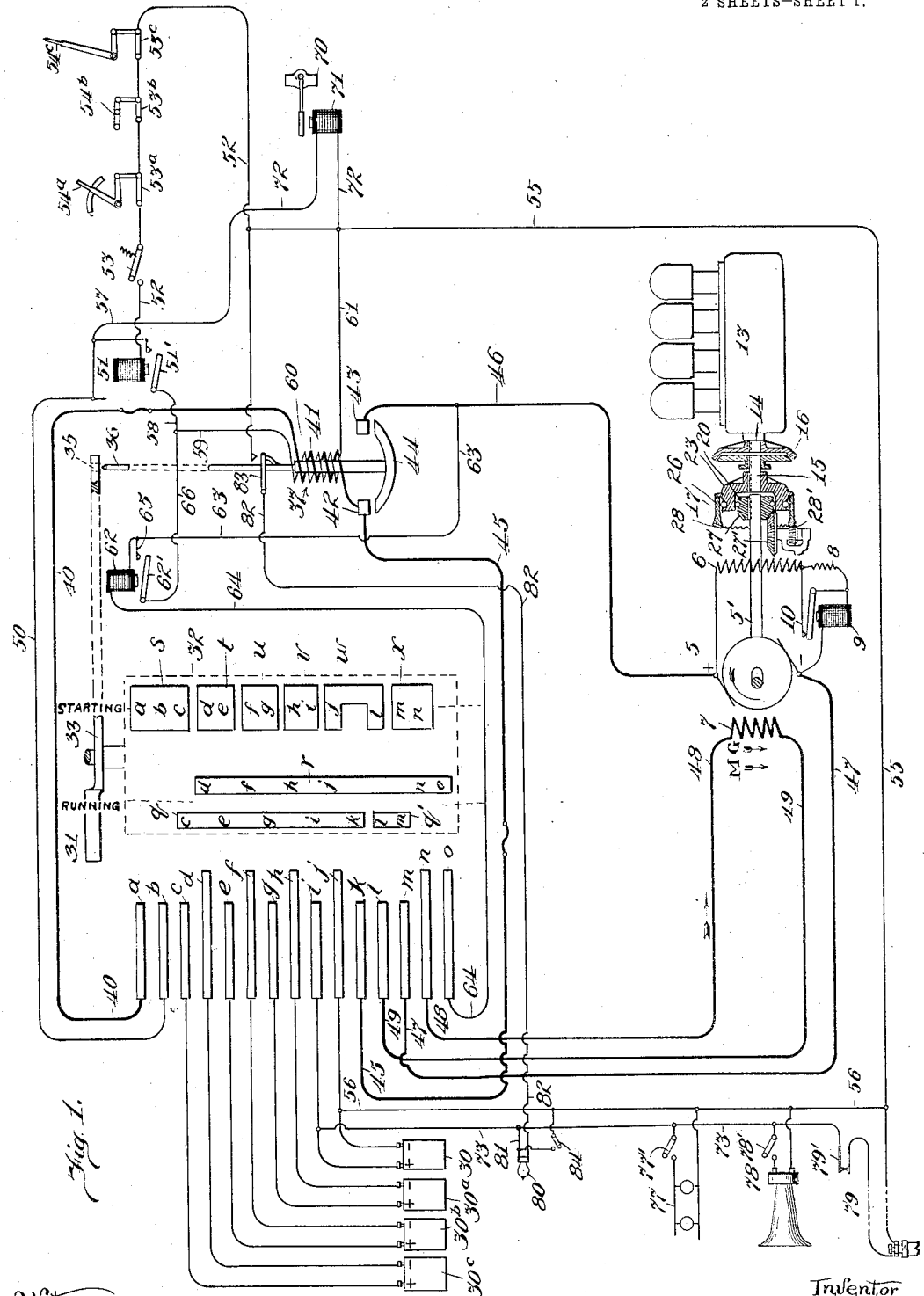

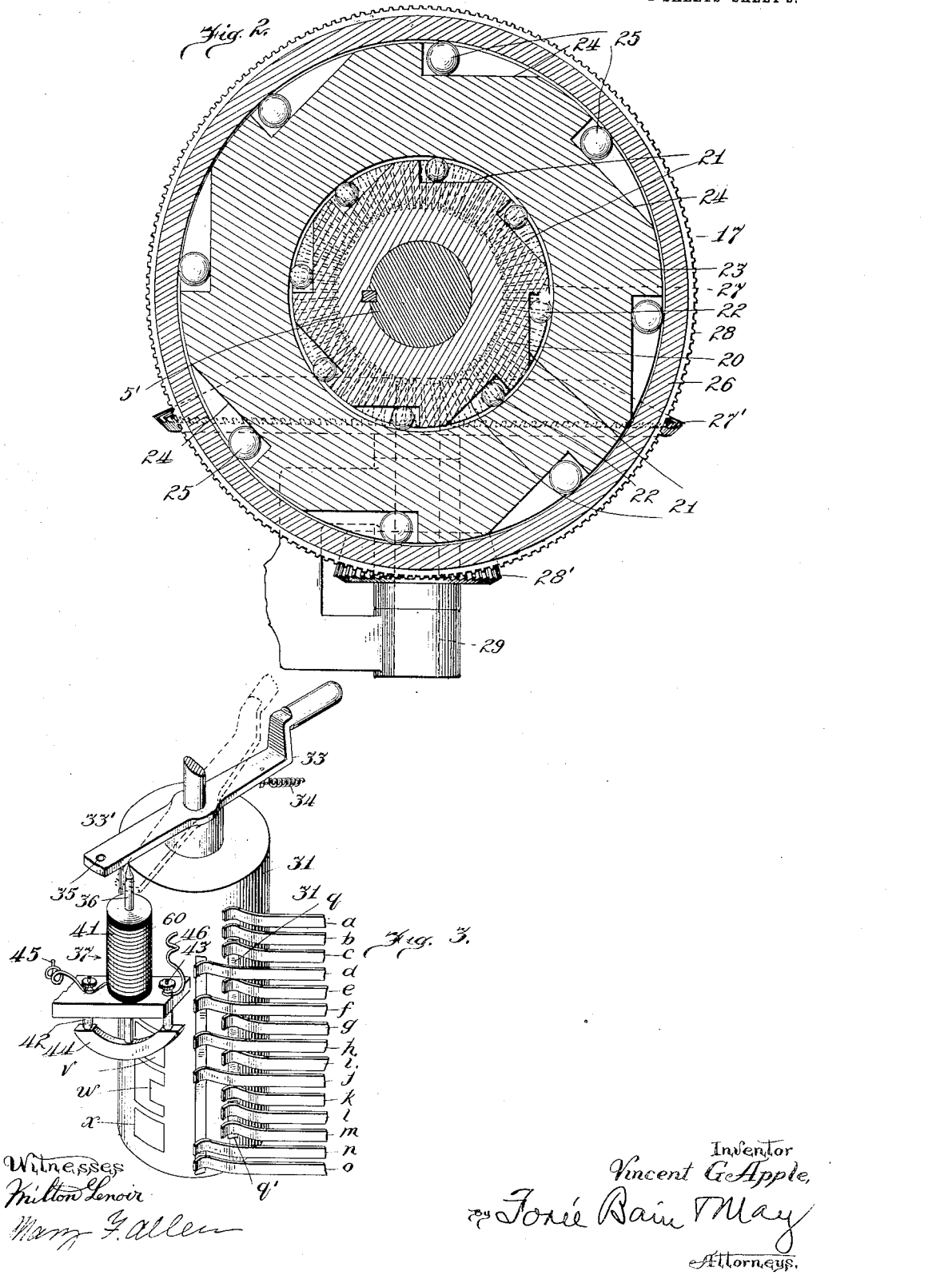

VINCENT G. APPLE, OF DAYTON, OHIO, ASSIGNOR TO THE APPLE ELECTRIC COMPANY, OF DAYTON, OHIO, A CORPORATION OF OHIO.

ELECTRICAL DISTRIBUTION SYSTEM FOR AUTOMOBILE CONTROL.

1,115,154.  Specification of Letters Patent.  Patented Oct. 27, 1914.

Application filed October 12, 1911. Serial No. 654,354.

*To all whom it may concern:*

Be it known that I, VINCENT G. APPLE, a citizen of the United States, residing at Dayton, in the county of Montgomery and State of Ohio, have invented certain new and useful Improvements in Electrical Distribution Systems for Automobile Control, of which the following is a specification.

My invention relates to improvements in electrical distribution systems for automobile control, and the like.

One of the objects of my invention is to provide a system wherein a dynamo electric machine, coöperating with a set of storage batteries, may be employed as a motor, receiving current from the storage batteries to start the engine and may also act as a generator, driven by the engine, acting as a primary source of current supply to charge the batteries.

A further object of my invention is to provide a system, of the character described, wherein means are provided to establish, preferably automatically at proper times, series connections between a plurality of storage battery units and the motor generator when the latter is operating as a motor, and parallel connections of the storage batteries when they are receiving current from the generator.

Another object of my invention is to provide such a system wherein the speed relation of the motor generator and the engine is automatically varied for low speed relation when the motor is driving the engine, and high relation when the engine is driving the generator.

A further object of my invention is to provide such a system wherein the various electrically operable instrumentalities of the automobile may be efficiently actuated under substantially constant voltage.

Another object is to provide means whereby the starting of the engine may be made dependent upon the prerequisite conditions of various instrumentalities for appropriate operation.

A further object of my invention is to improve the mechanical and electro-mechanical mechanisms and the coöperative relations thereof, in a system of the character described.

In the drawings, wherein I have illustrated an embodiment of my invention; Figure 1 is a schematic view, illustrating the system and parts diagrammatically; Fig. 2 is an enlarged view of a clutch employed in effecting coöperation between the dynamo and the engine; Fig. 3 is a perspective detail of fragments of an appropriate switch construction, simplified for clearness.

In the drawings, 5 indicates a dynamo electric machine, preferably compound wound, the shunt field winding being indicated at 6, and the series field winding at 7. For association with the shunt field, I provide preferably a suitable regulating resistance, indicated diagrammatically at 8, controlled by any suitable magnet arranged in circuit therewith, as at 9, the magnet 9 being adapted to control a switch 10 normally closed and in shunt with the regulating resistance 8, so that when the magnet 9 is sufficiently energized it opens the shunt 10 and inserts the regulating resistance 8 in series with the shunt field 6.

13 indicates the engine, the shaft 14 of which is connectible to the drive shaft section 15 by a manually operable clutch 16, said drive shaft section 15 being connectible to the dynamo shaft 5' as through the agency of an appropriate automatic gearing mechanism 17 of suitable form. The dynamo shaft 5' may, of course, have connection to the transmission gearing to drive the vehicle wheels, but such connections are well understood and are not shown. In the construction specifically shown in Fig. 2, 20 indicates an inner clutch member fast on the dynamo shaft 5', provided with circumferentially tapering ball recesses 21 containing clutch balls 22. The balls coact with the circular inner surface of an intermediate clutch member 23, fast on the shaft member 15, so that clock-wise rotation of the member 20 will leave the member 23 at rest, while clock-wise rotation of the member 23 will drive the inner member 20. The intermediate clutch member 23 is provided on its outer face with similar tapered pockets 24, containing the clutch balls 25 coacting with the cylindrical inner face of an exterior clutch member 26 so that clock-wise rotation of the member 23 shall leave the member 26 at rest, whereas clock-wise rotation of member 26 carries the member 23 therewith. The external clutch member 26 is driven from the dynamo shaft 5', through a suitable reducing gearing at any desired speed-ratio, the gearing herein diagrammatically shown comprising the beveled pinion 27 and beveled gear 28 on the inner and outer clutch members 20 and 26 respectively, coacting with the beveled gear 27' and pinion 28' arranged on suitable axially stationary shaft 29, supported in any fixed part of the mechanism.

It will now be apparent that considering the dynamo 5 as the driving element with its shaft rotating in clock-wise direction, as indicated by the arrow in Fig. 1, the inner member 20 merely slips with reference to the intermediate clutch member 23, but the dynamo drives the external clutch member 26 at reduced speed through the gearing connections 27—27', 29, 28', 28, and said external member drives the intermediate member 23 through the agency of balls 25. Thus the connecting shaft 15 will, under such circumstances, be driven from the dynamo 5, at greatly reduced speed but with correspondingly increased torque. Conversely, assuming the intermediate member 23 to be the driving element, as in the case where the engine is running faster than the dynamo tends to run, clutch member 23 has no effective connection with the external member 26, as the balls 25 roll to the deep end of their recesses, but said intermediate member, through the agency of balls 22, makes effective connection with the internal member 20 thereby to drive the dynamo 5' at the same speed as the engine shaft.

The dynamo element is associated with a set of storage batteries, 30, 30$^a$, etc., say four in number, through the agency of a controlling drum 31, and certain other controlling mechanism to be described. The controller 31 may be of any suitable character for movement to two positions, to effect appropriate connections between certain groups of contacts, the particular controller structure diagrammatically shown, comprising a drum carrying contacts for coöperation with fifteen brushes, lettered successively from $a$ to $o$, the brushes $d$, $f$, $h$, $j$, $n$, and $o$ being elongated and the remaining brushes relatively short. The movable element of the controller comprises an oscillating drum 31, on which are mounted two sets of contacts. One set comprises alining contact strips $q$, $q'$, and the parallel strip $r$, strips $q$ and $q'$ being arranged respectively to connect groups of short brushes $c$, $e$, $g$, $i$, $k$, and $l$, $m$, while contact $r$ connects elongated contacts $d$, $f$, $h$, $j$, $n$, $o$. The other group of contacts on the drum consists of plates $s$, $t$, $u$, $v$, $w$ and $x$, so arranged that plate $s$ may connect contacts $a$, $b$, $c$; plate $t$ may connect brushes $d$ and $e$; that plate $u$ may connect brushes $f$ and $g$; plate $v$ may connect brushes $h$ and $i$; that plate $w$ may connect contacts $j$ and $l$, (skipping $k$) and plate $x$ may connect brushes $m$ and $n$.

When the engine is to be started, the drum 32 is moved to starting position such that the contacts $s$, $t$, etc., effect their connections with the stationary contacts, and after the engine is started and the system is in running condition, the drum is oscillated, preferably, automatically, to cause contacts $q$, $q'$, and $r$, to coact with the stationary brushes. As a simple expedient for effecting the automatic shifting of the drum 32, I illustrate in Fig. 3 a lever 33, acted on by a spring 34, to tend to throw the drum to running position (the position shown in said view), said arm 33 having extension 33' in which is an aperture 35, to receive a pin 36 of a solenoid relay 37 when the solenoid is energized. As will be hereafter described, solenoid 37 is energized while the engine is being started, but becomes deënergized when the engine begins to run under its own power, the deënergization of solenoid 37 releasing the latch 35—36 to permit the drum to fly from starting position to running position. Thus the solenoid and associated parts constitute in the system an automatic switch for effecting the desired changes in relation between the other devices of the system.

The respective positive and negative poles of the battery units 30$^c$, 30$^b$, 30$^a$, and 30, are connected to the fixed contact pairs $c$—$d$, $e$—$f$, $g$—$h$, and $i$—$j$. Fixed contact $a$ has connection 40 to a low resistance winding 41 of cut-out 37 and thence to one contact 42 of the switch pair 42—43 controlled by blade 44 on the solenoid core. When solenoid 37 is energized, switch 42—43—44 closes. The said contact 42 has wire connection 45 to drum brush $k$, while contact 43 has connection 46 to the positive brush of the dynamo 5, the negative brush whereof is connected by wire 47 to the drum brush $m$. The series field winding 7 of the generator is connected by wires 48 and 49 to the brushes $n$ and $l$ respectively of the drum. Brush $b$ has wire connection 50 to one terminal of a relay 51, the opposite terminal of which is connected with a controlling circuit wire 52, and thence by wires 55 and 56 to the negative terminal of battery 30. In the controlling circuit wire 52 are arranged any desired number of switches, as 53, 53$^a$, 53$^b$, and 53$^c$, the three switches last mentioned being respectively controlled, for example, by the spark-control lever 54$^a$, the gasolene valve lever 54$^b$, and the clutch-shifting lever 54$^c$. The suggested illustration is merely indicative of the fact that in the controlling circuit may be placed any number of switches, the closing of which require that certain instrumentalities of the automobile be placed in predetermined position suitable for starting in order that the controlling circuit may be closed when the manual switch 53 is thrown to closed position.

The armature 51' of relay 51, coacts with a front contact connected by wire 57 to wire 50, said armature having connection by wires 58 and 59 to a high resistance coil 60 of the cut-out 37, and the opposite terminal of said coil being connected by wire 61 to the wire 55. A second relay 62 is provided having one connection 63 to the wire 46 and its other terminal connected as by wire 64 to the brush o of the drum. The armature 62' of said relay coacts with a contact connected by wire 65 to the wire 63, said armature having connection 66 to the wire 59.

The various instrumentalities to be automatically actuated on the automobile may be connected in appropriate circuits supplied by the battery, the present showing illustrating a tickler valve 70 for the engine controlled by a magnet 71, bridged by wire 72 between wires 55 and 57. A wire 73 is run from the positive pole of battery 30 and between the wires 73 and 56, may be bridged the lamp connections 77, signal connections 78, and suitable ignition connections 79, each said set of connections controlled by an appropriate switch 77'—78'—79'.

In order that the condition of the solenoid switch 37 may be visually indicated at a convenient point, I provide a pilot lamp 80 connected by wire 81 with wire 73 and by wire 82 with the wire 55. In said connection 82 is a switch 83 closed when the solenoid core is raised, but otherwise opened, so that the pilot lamp 80 always shows the solenoid condition. A test switch 84, connected between wires 81 and 56 may be provided to enable the lamp 80 to be connected directly across the terminals of battery 30 for test.

In the operation of the system, assuming the engine to be at rest, the starting function is effected by throwing the drum lever 33 over to starting position, whereupon the broad contacts s, t, etc., will coact with the brushes a, b, c, etc. Assuming the switch lever 33 to be held in such starting position, (manually or by automatic means not shown) the establishment of the respective connections by the movable contacts s, t, etc., group the batteries 30 to 30ᶜ in series with one terminal of the series at brush c and the other terminal of the series at brush j. Now the controlling wire 52 must have all its switches closed, by throwing the transmission into neutral, retracting the spark, etc., to insure that all conditions prerequisite to the starting of the engine are fulfilled, the switch 53 being manually closed until (through automatic closure of switch 83, as hereafter described) pilot light 80 glows, and then being opened. A controlling circuit is established from positive terminal of battery unit 30ᶜ as follows: c, s, b, 50, 51, 52, 53, 53ᵃ, 53ᵇ, etc., 55, 56, to the negative terminal of battery unit 30, the magnet 71 for the tickler being also thrown into the circuit in direct parallel with the relay 51. As the relay 51 closes its armature switch 51', the following cut-out circuit is established, 30ᶜ, c, s, b, 50, 57, 51', 58, 59, 60, 61, 55, 56, 30, thereby to energize the high resistance coil of the cut-out 37, the core of which rises, closing the switch blade 44 to connect contacts 42 and 43, and also closing switch 83 to connect the pilot lamp 80 in circuit (30, 73, 81, 80, 82, 83, 55, 56, 30). Consequently the following motor circuit is established: 30ᶜ, c, s, a, 40, 41, 42, 44, 43, 46 to dynamo armature and shunt field, 47, m, x, n, 48, series field 7, 49, l, w, j, 30. The controlling circuit being now broken at 53, and relay 51 being deënergized, low resistance coil 41 in the motor circuit just described alone keeps the solenoid 37 energized. Thus the dynamo is connected in circuit as a motor with the series-connected battery units, the relatively high voltage of which, due to the series connection, may overload considerably the dynamo as the work thereof as a motor unit will not be long continued. The high excitation of the shunt field circuit causes magnet 9 to open switch 10, cutting in the resistance 8, thereby to weaken the field somewhat and to increase the speed of the motor, the compound winding, however, insuring proper torque.

As soon as the dynamo begins to run as a motor the automatic clutch 17 causes the shaft 5' to drive at greatly reduced speed the shaft 15, which through the clutch 16 may be connected to the engine. On account of the relatively high torque of the compound wound generator, temporarily overcharged by the battery, the motor is enabled through the reduction gear to start the engine. As soon as the engine shaft attains a speed greater than that of the external member 28 of the clutch 17 the engine, through said automatic clutch, begins to tend to drive the dynamo as a generator, and the current value in the line circuit described including the low resistance coil 41 of the solenoid 37, is so reduced that the solenoid drops its core, causing the switch blade 44 to open contacts 43 and 42, and also freeing the arm 33' of the controller drum, so that the spring 34 throws the controller drum automatically from starting position to running position, bringing the drum contacts q, q' and r, into operative association with the stationary brushes, a, b, c, etc. Now in the operation of the dynamo as a generator current flows from the positive brush 5 by the relay circuit 46, 63, 62, 64, o, r, n, 48, 7, 49, l, q', m, 47, to the negative brush of the generator. The consequent energization of the relay magnet 62 causes the closure of the switch 62', so that the current may flow from the positive brush of the generator by the cut-out circuit 46, 63, 65, 66, 59, 60, 61, 55, 56, j, r, n, 48, 7, 49, l, q', m, 47, to the negative brush of the generator. The consequent energization of the solenoid 37, causes the closure of contacts 42 and 43, by blade 44, thereby establishing from the positive pole of the generator, 5, the generator circuit 46, 43, 44, 42, 45, $k$, $q$, to $i$, $g$, $e$, and $c$ through the batteries in parallel to their negative terminals $d$, $f$, $h$, and $j$, drum contact $r$, $n$, 48, 7, 49, $l$, $q'$, $m$, 47, the negative pole of the generator. The action of the drum contact having served to reverse the connections of the field, the generator acts properly as a compound wound machine driven at engine speed through the automatic clutch 17, and tending through the provision of the controlling resistance 8 and magnet 9, to increase the resistance of the shunt field and decrease the charging current whenever the generator speed exceeds a predetermined limit.

From the battery 30 alone, where the batteries are series connected, and from all of the batteries when they are connected in parallel, the feed wires 56 and 73 distribute current to the various working circuits, enabling the lights, ignition devices, horn and the like, to be operated under substantially constant conditions, whether the battery be charging or discharging.

While I have herein described in some detail a single embodiment of my invention for full disclosure, it will be apparent to those skilled in the art that numerous changes may be made without departure from the spirit of the invention and within the scope of the appended claims.

What I claim is.

1. In a system of the character described, the combination of an engine, a dynamo, storage batteries, means to connect the dynamo to drive or to be driven by the engine, means to connect the storage batteries in series with the dynamo to drive the latter as a motor, and automatic means to disrupt the series connection and to connect said batteries in parallel with the dynamo, to receive current therefrom as a generator.

2. In a system of the character described, an engine, a dynamo arranged for connection to the engine to drive or to be driven by the latter, means to connect the storage batteries in series with the dynamo to drive the latter as a motor, and means automatically operable in response to current value in the battery-motor circuit to connect the storage batteries in parallel with the dynamo to receive current therefrom as a generator.

3. In a system of the character described, the combination with a storage battery, of a dynamo electric machine, an engine arranged to drive or be driven by said dynamo electric machine, a controller for connecting said battery and dynamo electric machine for operation either as a motor or a generator, means normally tending to move said controller from motor to generator position, means to hold said controller at the motor position and automatic means to release the said holding means.

4. In a system of the character described, the combination with storage batteries, of a dynamo electric machine, an engine arranged to drive or be driven by said dynamo electric machine, a controller connecting said batteries and dynamo electric machine for operation either as a motor or a generator, means normally tending to move said controller from motor to generator position, means to hold said controller at the motor position and magnetic means responsive to low current value to release said holding means.

5. In a system of the character described, the combination with storage batteries, of a dynamo electric machine, an engine arranged to drive or be driven by said dynamo electric machine, means comprising a circuit for connecting said batteries and dynamo electric machine for operation as a motor, means responsive to current flow in said circuit automatically to rupture said circuit at a predetermined low current value and automatic means to connect the batteries in parallel with the dynamo electric machine upon rupture of said circuit.

6. In a system of the character described, the combination with storage batteries, of a dynamo electric machine, an engine arranged to drive or be driven by said dynamo electric machine, means comprising a circuit connecting said batteries and dynamo electric machine for operation as a motor, means responsive to current flow in said circuit, automatically to rupture said circuit at a predetermined low current value and means controlled by said current responsive means to automatically connect the batteries in parallel and with the said dynamo electric machine.

7. In a system of the character described, storage batteries, a dynamo, an engine having manually-operable controlling means, said engine arranged to drive or to be driven by the dynamo, suitable circuit connections for connection of the dynamo and batteries for operation of the dynamo by the batteries as an engine-starting motor or for operation of the dynamo by the engine as a generator to supply the batteries; circuit-controlling means for said circuit connections, and a controlling circuit for said circuit-controlling means having therein a switch closable by said engine-controlling means when the latter is properly set for engine starting.

8. In a system of the character described, a storage battery, a dynamo-electric machine, an engine arranged to drive or be driven by the dynamo-electric machine, a controller providing fixed and movable contacts, shiftable to connect the dynamo to be driven as a motor by the battery, or to connect said dynamo to supply the battery with current as a generator, an automatic switch for the dynamo-battery circuit, having switch operating windings, one set of windings connectible in series with, and another set connectible in shunt to, the dynamo battery circuit, means governed by the controller for connecting said automatic switch in the motor circuit with one set of windings thereof in series, and means governed by the controller for connecting said automatic switch in the generator circuit with the other set of windings thereof in shunt.

9. In a system of the character described, an engine, a dynamo arranged to drive or be driven by the engine, a storage battery, a circuit controller, a controlling circuit arranged for operative connection with the battery when the circuit controller is in one position, means automatically responsive to closure of said controlling circuit to connect the dynamo and the battery; another circuit arranged for operative connection with the dynamo when the circuit controller is in another position, and means automatically responsive to closure of the last said circuit to connect the dynamo and battery.

10. In a system of the character described, an engine, a dynamo arranged to drive or be driven by the engine, a storage battery providing a plurality of units, a circuit controller arranged when in "starting" position to group the battery units in series, and in "running" position to group the battery units in parallel, a controlling circuit, arranged for operative connection with the battery at the controller when the latter is in "starting" position, a circuit for connecting the batteries when in series with the dynamo for operating it as a motor, means automatically responsive to closure of the controlling circuit to close said last mentioned circuit, means to open said circuit responsive to predeterminedly low current value therein, means to shift the controller to running position responsive to such rupture of the circuit, and means conditioned for operation by movement of the controller to running position, automatically to connect the paralleled batteries with the dynamo for operation as a generator.

11. In a system of the character described, a dynamo, a storage battery, a cut-out and switch therefor, a controller, means to operate said controller, means for connecting the dynamo in circuit with the battery for operation as a motor and a second means for connecting the dynamo in circuit with the battery for operation as a generator, said circuit including the controller and the cut out switch.

12. In a system of the character described, a dynamo, a storage battery, a cut out and a switch therefor, a controller movable to two positions, means to move the controller, means for connecting the dynamo in circuit with the battery, either as a motor or a generator, both of said circuits including said cut out switch and both including the controller in its different positions.

13. In a system of the character described, comprising a plurality of storage battery units, a dynamo electric machine, an engine arranged to drive and to be driven by said machine, a controller, circuit connections for said controller and dynamo, said controller being shiftable to connect the dynamo to be driven as a motor by the battery units, and to connect said dynamo as a generator to supply the battery units, and an automatic switch for establishing the said circuit connections, through said controller, and a controlling circuit connected to said battery for controlling said automatic switch.

14. In a system of the character described, comprising a plurality of storage battery units, a dynamo electric machine, an engine arranged to drive and to be driven by said machine, a controller, circuit connections for said dynamo and said controller, said controller being shiftable to connect the dynamo to be driven as a motor, by the battery units, and to connect said dynamo as a generator to supply the battery units, an automatic switch for establishing the circuit connections, through said controller, to start the dynamo as a motor, and to reestablish the dynamo circuit, through said controller, after said controller has been shifted to position to connect the dynamo to operate as a generator and a controlling circuit connected to said battery units for controlling said automatic switch.

15. In a system of the character described, comprising a plurality of storage battery units, a dynamo electric machine, an engine arranged to drive and to be driven by said machine, a controller, circuit connections for said dynamo and said controller, said controller being shiftable to connect the dynamo to be driven as a motor by the battery units, and to connect said dynamo as a generator to supply the battery units, an automatic switch for establishing the said circuit, through said controller, to start the dynamo as a motor, and to reestablish the dynamo circuit through said controller, after said controller has been shifted to position to connect the dynamo to operate as a generator and a controlling circuit connected to said battery units for controlling said automatic switch, and a circuit, operable by said controller and connected to said dynamo, when said controller has been shifted, to maintain said switch closed.

16. In a system of the character described, comprising a plurality of storage battery units, a dynamo electric machine, an engine, arranged to drive and to be driven by said machine, a controller, circuit connections for said controller and said dynamo, said controller being shiftable to connect the dynamo to be driven as a motor by the battery units, and to connect said dynamo as a generator to supply the battery units, hand operable means to shift said controller to "starting position," automatic means to return the controller to "running position," an automatic switch for establishing the dynamo circuit, to operate the dynamo as a motor, and to lock said controller in "starting position," and a controlling circuit connected to said battery for initially controlling said automatic switch.

17. In a system of the character described, comprising a plurality of storage battery units, a dynamo electric machine, and an engine, arranged to drive and to be driven by said machine, a controller, circuit connections for said controller and said dynamo, said controller being manually shiftable to connect the dynamo and said battery units in series relation, to drive said dynamo as a motor and automatically shiftable to connect said battery units and said dynamo in parallel relation, when said dynamo is operating as a generator, means tending to return said controller from the last mentioned position, an automatic switch for establishing the dynamo circuit when said dynamo is acting as a motor, and for holding said controller in position into which it has been manually moved, against said controller returning means, and a controlling circuit for controlling said switch, whereby said controller is released when the latter circuit is opened.

18. A system of the character described comprising storage batteries, a dynamo, an engine arranged to drive or to be driven by the dynamo, a switch and circuit connections initially operable to connect the dynamo and batteries for operation of the dynamo as a motor and subsequently operable to connect said dynamo and batteries for operation of the dynamo as a charging engine-driven generator, and means to initiate operation of said switch including a circuit connected to said batteries for control of said switch, and a circuit closing switch in said control circuit.

19. In combination, an engine, a dynamo electric machine, adapted for connection thereto at relatively high and relatively low speed, a storage battery, normally arranged for parallel connection with said dynamo, a fly-back controller manually operable to connect the batteries in series with the dynamo for operation as a motor, to start the engine, and automatically operable to reestablish the battery in parallel relation with the dynamo, when the latter is acting as a generator.

20. In combination with an engine, a dynamo electric machine, for connection thereto at relatively high and relatively low speed, a plurality of storage battery units, a fly-back controller, manually operable to connect said batteries in series relation to start the engine, and automatically operable to reestablish the batteries in parallel relation with said dynamo when the latter is acting as a generator.

21. In a system of the character described, the combination of a dynamo, storage batteries, a dynamo-driving engine adapted to be started by the dynamo; an automatic switch having contacts; circuit connections controlled by said contacts to establish a circuit for operation of the dynamo as an engine-starting motor, said switch breaking said circuit automatically when the dynamo is driven by the engine; a controller automatically movable to position to change said circuit connections, and means to close said switch again after movement of said controller, for establishment of a circuit for operation of the dynamo as a generator.

22. In a system of the character described, a dynamo, storage batteries, an engine for the dynamo, circuit connections for the storage batteries and the dynamo, and controlling means therefor including an automatic switch, a manually-controllable relay circuit for closing the switch, means affected by operation of the dynamo when driven by the engine to open said switch, a relay circuit affected by said opening of the switch and means controlled by said relay circuit for closing said switch to establish different circuit connections between the batteries and dynamo.

In testimony whereof I hereunto set my hand in the presence of two witnesses.

VINCENT G. APPLE.

In the presence of—
CARL L. BAUMANN,
E. V. MARTIN.